L. and S. H. BACHELDER.
Walking Planter.
No. 51.
A I Patented April 1, 1842.
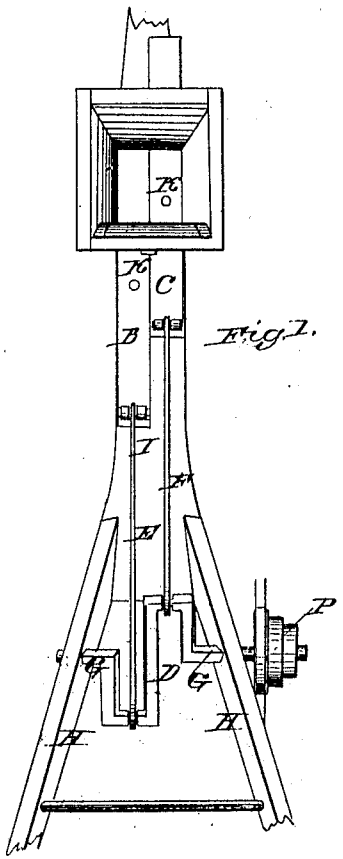
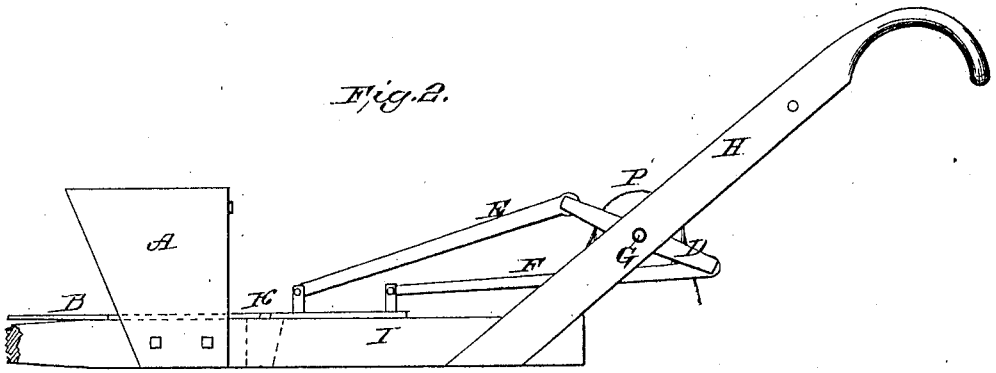
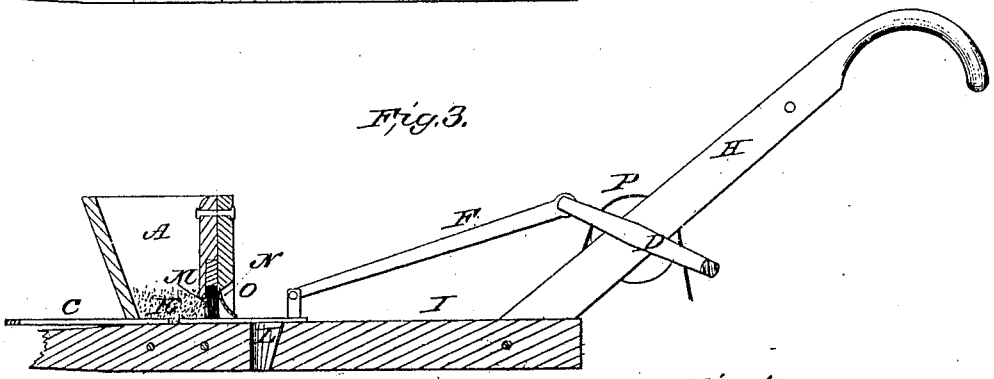
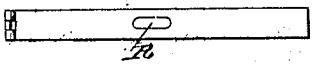
N. PETERS, PHOTO-LITHOGRAPHER, WASHINGTON, D. C.

UNITED STATES PATENT OFFICE.

LORENZO BACHELDER AND SAMUEL H. BACHELDER, OF HAMPSTEAD, N. H.

IMPROVEMENT IN SEED-PLANTERS.

Specification forming part of Letters Patent No. 1,577, dated April 13, 1840; Additional Improvement No. 51, dated April 1, 1842.

*To all whom it may concern:*

Be it known that we, LORENZO BACHELDER and SAMUEL H. BACHELDER, of Hampstead, in the county of Rockingham, in the State of New Hampshire, have invented a new and useful improvement in the machinery for planting corn or other seeds for which Letters Patent were granted to us on the 30th day of April, in the year 1840; and we do hereby declare that the following is a full, clear, and exact description of the construction and operation of the same, reference being had to the accompanying drawings, which, taken in connection with said description, constitutes our specification, wherein we have set forth the principles of our invention, by which it may be distinguished from others of a like character, together with such parts or combinations as we claim and for which we solicit an exclusive property to be secured to us for the remainder of the term for which the aforesaid Letters Patent were granted.

Figure 1 of the above-mentioned drawings represents a top view of a portion of the main beam of the seed-planter with our improvement applied thereto. Fig. 2 is a side elevation, and Fig. 3 a longitudinal and vertical cross-section, of the same. Fig. 4 is a top view, and Fig. 5 a side view, of the drilling slide, which will be hereinafter more particularly explained.

Our improvement consists in the method of discharging the seed from the hopper A by two metallic slides, B and C, operated or moved to and fro alternately by a double bell-crank, D, acting on the same through the intervention of connecting-rods E F, which are each jointed to one of the slides and its opposite crank. The double bell-crank is particularly exhibited in Fig. 1, the journals of its shaft G resting and moving in bearings formed in the guide-handles H H. The slides B C consist of rectangular plates or bars placed or arranged side by side on the upper surface of the beam I, and pass into and entirely through the hopper, as represented in Figs. 1, 2, 3. Each of the slides has an aperture, K, for the reception of the seed, cut or bored through the same, which, when the slide is drawn outward from the hopper, is brought over the passage L, Fig. 3, of the beam leading to the discharge. A brush, M, Fig. 3, is placed in the back of the hopper, with the points of the bristles resting upon the top surface of the slides B C, and directly in rear of this brush is a piece of thin leather, N, whose upper edge is attached to the top of the opening O in the side of the hopper in rear of the brush, the said leather being somewhat larger than the depth of the opening, so as to incline or curve outward from the brush and rest at its lower edge on the top of the slides, as seen in Fig. 3. The object of the leather is to prevent the scattering of the seed by the spring of the brush. The revolution of the shaft G of the double bell-crank is caused by a cone of pulleys, P, fixed on one end of the same. A band from the cone of pulleys on the shaft of the main roller passes over the cone P and gives motion to the same. Each slide is moved back and forth under the hopper, thereby causing the seed receptacle or aperture K, on being filled with seed, to pass outward from the hopper under the brush until it arrives over the opening L, through which the seed, on being relieved, falls to the ground. The passage of two slides by each other in opposite directions so effectually rolls over or stirs up the seed in the hopper that the receptacles in the plates are always filled with the requisite quantity of seed; but should either one of them by any accident not be filled or perform its necessary operation of discharging the seed the same can at once be detected by the eye of the attendant of the machine. With but one slide planting most seeds the motion would be too rapid to drop with certainty. Therefore I use two slides, moved to and fro alternately by the bell-crank, thus dropping at such regular intervals of time as may be desirable by a slower motion of the slides than I could otherwise obtain.

Figs. 4 and 5 represent an extra slide, having an elongated aperture, R, therein for planting in drills. By means of this peculiar-shaped seed-receptacle the seed will be gradually dropped from the slide as the machine progresses, so as to be regularly scattered in the ground.

It will be evident to any mechanic that any desirable number of slides may be arranged side by side at the bottom of the hopper and operated substantially in the same manner as above. Their seed-receptacles may all discharge into one large opening, L, which has a tube proceeding therefrom to the ground, so that the operation of dropping at short distances may be easily carried on by the combination of slides each having a very slow movement.

Having thus described our improvement, we shall only claim—

The combination of the piece of leather (applied to the hopper-opening in rear of the brush so that its lower edge shall rest on the upper surface of the slides) with the brush, the same being arranged in manner and for the purpose above set forth.

In testimony that the foregoing is a true description of our said invention and improvement, we have hereunto set our signatures this 17th day of August, in the year 1841.

LORENZO BACHELDER.
SAMUEL H. BACHELDER.

Witnesses:
HIRAM PLUMMER,
ISAAC R. HOWE.